United States Patent
Boyer et al.

(10) Patent No.: US 7,377,267 B2
(45) Date of Patent: May 27, 2008

(54) INJECTION STRATEGY TO MAXIMIZE EFFICIENCY IN GASEOUS ENGINE

(75) Inventors: Brad Boyer, Canton, MI (US); William Stockhausen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/554,531

(22) Filed: Oct. 30, 2006

(65) Prior Publication Data

US 2008/0099002 A1     May 1, 2008

(51) Int. Cl.
*F02B 43/00*     (2006.01)

(52) U.S. Cl. .................. 123/527; 123/472; 123/316

(58) Field of Classification Search .......... 123/527, 123/525, 27 GE, 478, 90.15, 472, 295, 305, 123/90.16, 575, 316
See application file for complete search history.

(56) References Cited

U.S. PATENT DOCUMENTS

| | | | |
|---|---|---|---|
| 5,127,230 A | 7/1992 | Neeser et al. | |
| 5,329,908 A | 7/1994 | Tarr et al. | |
| 5,373,700 A | 12/1994 | McIntosh | |
| 5,533,492 A * | 7/1996 | Willey et al. | 123/681 |
| 5,771,857 A | 6/1998 | Willi | |
| 5,941,210 A | 8/1999 | Hill et al. | |
| 6,298,829 B1 | 10/2001 | Welch et al. | |
| 6,779,337 B2 | 8/2004 | Tang et al. | |
| 6,988,492 B2 | 1/2006 | Shetley | |
| 7,117,830 B1 * | 10/2006 | Boyer et al. | 123/90.15 |
| 2005/0224057 A1 | 10/2005 | Tokumaru et al. | |
| 2005/0224060 A1 | 10/2005 | Hill et al. | |

FOREIGN PATENT DOCUMENTS

| | | |
|---|---|---|
| GB | 2285144 | 6/1995 |
| GB | 2288374 | 10/1995 |
| JP | 2003028006 | 1/2003 |
| JP | 2004346842 | 12/2004 |
| JP | 2006077638 | 3/2006 |
| WO | 2006079173 | 8/2006 |
| WO | 2006122427 | 11/2006 |

* cited by examiner

*Primary Examiner*—Stephen K. Cronin
*Assistant Examiner*—Hyder Ali
(74) *Attorney, Agent, or Firm*—Julia Voutyras; Alleman Hall McCoy Russell & Tuttle LLP

(57) ABSTRACT

A method is provided for an engine capable of burning gaseous fuel, the engine also including a combustion chamber, a fuel supply system with at least one fuel tank, at least one intake valve, and at least one exhaust valve, an injector to directly inject gaseous fuel into the combustion chamber, and an exhaust oxygen sensor. The method comprises directly injecting fuel from the injector into the chamber at a variable supply pressure which decreases as fuel tank pressure decreases; and adjusting at least one of an injection time and duration based at least on said variable pressure and information from the exhaust oxygen sensor.

18 Claims, 6 Drawing Sheets

INJECTION STRATEGY TO MAXIMIZE EFFICIENCY IN GASEOUS ENGINE

FIELD

The present application relates to system and method to improve fuel economy in engines burning gaseous fuel.

BACKGROUND AND SUMMARY

Gaseous fueled vehicles may store fuel in pressurized tanks (made from carbon fiber, for example) at maximum pressures of approximately 350 to 700 bar. Significant energy may be stored in the compressed gas at these high pressures and such energy may be lost when the pressure is throttled down to the 5-10 bar range of port fuel injection type engines, or to the 50-150 bar range of direct injection engine.

One approach aimed at recovering at least some of the compressed gas energy is described in U.S. Pat. No. 5,941,210. The disclosed approach uses a turbocharger run by the compressed gas flow to recover expansion energy during the regulation process when the gaseous fuel pressure is reduced to supply fuel to a direct injection engine. It also describes injection at variable fuel pressures without regulation, where a control means responds to changes in the pressure of the fuel supply system. In this regard, a pressure measurement device is provided in the fuel supply system.

However, the inventors herein have recognized that in some cases, such a system may increase the cost and/or complexity of the fuel supply system because of the addition of the turbocharger and associated equipment, which can further complicate operation in the event of degradation in the turbocharger and/or associated equipment. This can decrease the ability to accurately regulate fuel pressure and/or recover compressed gas energy. Further, when relying on pressure measurements to respond to changes in fuel pressure, oscillations in fuel pressure caused by actuation of the injectors can generate errors in fuel delivery, again decreasing the ability to accurately regulate fuel pressure. Such degraded operation may be especially prevalent under widely varying tank pressures experienced when trying to recover compressed gas energy in the fuel system.

To address at least some of the above issues, various methods may be provided. In one embodiment, a method may include: directly injecting fuel from the injector into the chamber at a variable supply pressure which decreases as fuel tank pressure decreases; and adjusting at least one of an injection timing and duration in response to at least said variable pressure and information from the exhaust oxygen sensor. In one example, the injector may be a piezoelectric type injector with sufficiently fast response time to enable compensation for widely varying fuel pressure, thereby reducing pressure loss due to regulation. Further, the timing of the injection may be later in the compression stroke and in the expansion stroke (during closed intake and exhaust valve conditions) to enable recovery of the compressed gas energy. Of course, additional injections during the cycle, and other fast-response injector designs, may also be used.

The above approach may have various advantages. For example, by adjusting injection control in response to both the variable fuel pressure and feedback from an exhaust gas oxygen sensor, it may be possible to accurately control gaseous fuel delivery over a widely varying fuel pressure range, even in the face of widely varying fuel delivery amounts and timing across the engine speed and load range. In this way, compressed energy in the stored fuel may be recovered in the cylinder while still maintaining acceptable fuel control.

Note that the above approach may be used without pressure regulation, although it is also applicable, if not more applicable, to systems including at least some pressure regulation in the fuel system, which may include variable pressure regulation. For example, under engine operating conditions of reduced injector pulsewidth, increased pressure regulation may be used, whereas during conditions of increased injector pulsewidth, reduced pressure regulation may be used, thereby enabling accurate control and increased compressed gas energy recovery when possible.

DETAILED DESCRIPTION

Figure 1:
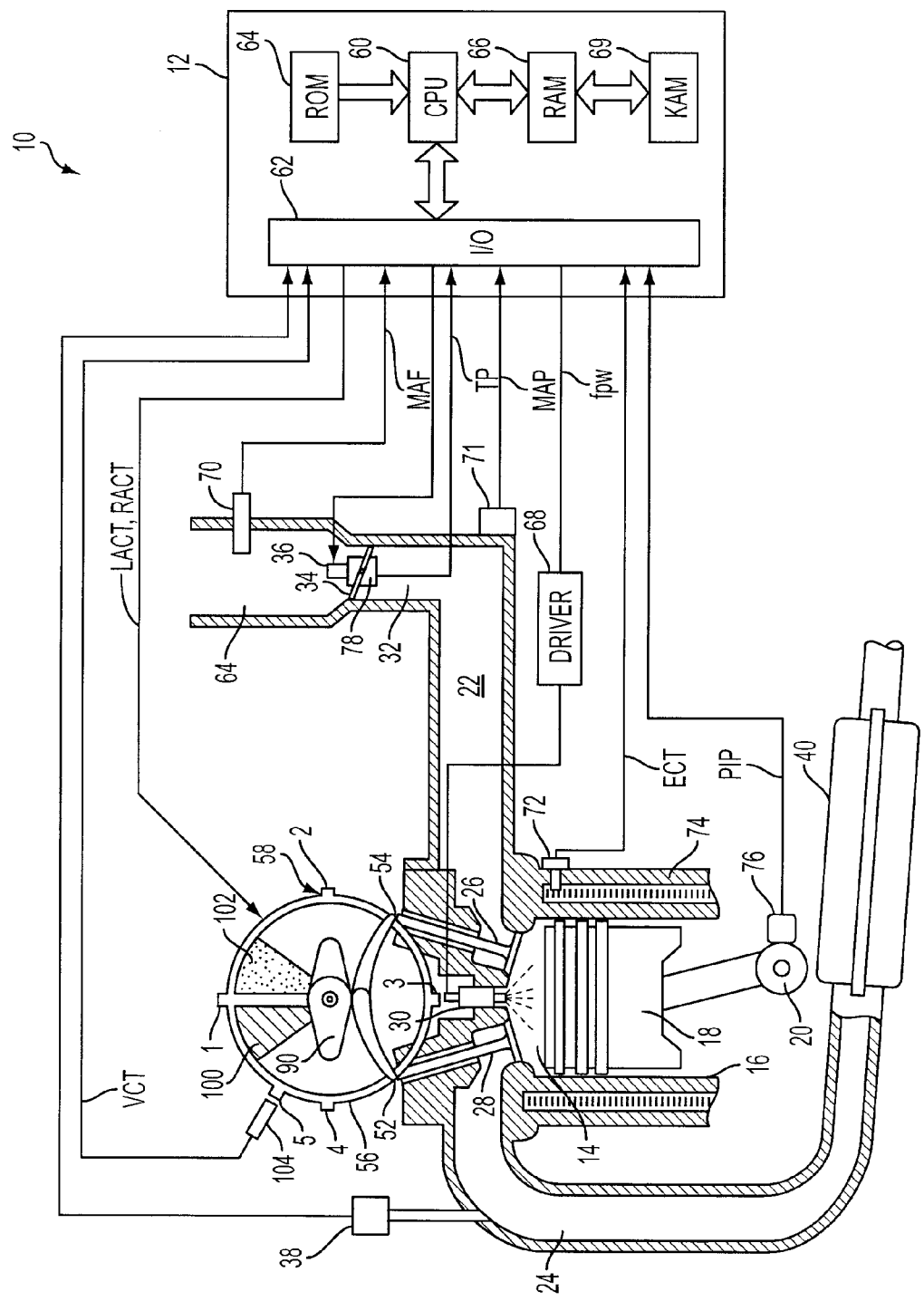
FIG. 1 is a schematic depiction of an exemplary embodiment of an engine burning gaseous fuel.

FIG. 1 shows, generally at 10, an exemplary embodiment of one cylinder of a multi-cylinder engine, intake and exhaust paths connected to that cylinder, and an exemplary embodiment of a camshaft having a variable timing mechanism for controlling the valves of the cylinder. It will be appreciated that the configuration of engine 10 is merely exemplary, and that the systems and methods described herein may be implemented in any other suitable engine. Further, the engine may be spark ignited via a spark plug located in the cylinder (not shown), the timing of which may be varied with operating conditions.

Continuing with FIG. 1, engine 10 is controlled by electronic engine controller 12. Combustion chamber, or cylinder, 14 of engine 10 is shown including combustion chamber walls 16 with piston 18 positioned therein and connected to crankshaft 20. Combustion chamber 14 is shown communicating with intake manifold 22 and exhaust manifold 24 past intake valve 26 and exhaust valve 28. Fuel injector 30 is coupled to combustion chamber 14 for delivering injected fuel directly therein in proportion to the fuel pulse width (fpw) signal received from controller 12 via conventional electronic driver 68. Fuel is delivered to fuel injector 30 by a gaseous fuel system (not shown) including a fuel tank, fuel pumps, and a fuel rail.

Intake manifold 22 is shown communicating with throttle body 32 which contains throttle plate 34. In this particular example, throttle plate 34 is coupled to electric motor 36 so that the position of throttle plate 34 is controlled by controller 12 via electric motor 36. In an alternative embodiment (not shown), throttle body 32 and throttle plate 34 are omitted.

Exhaust gas sensor 38 is shown coupled to exhaust manifold 24 upstream of an aftertreatment device 40. Aftertreatment device 40 may include any suitable type of device for reducing emissions from engine 10. Examples include, but are not limited to, three-way and four-way catalytic converters, particulate filters, lean NOx trap, etc.

Controller 12 is shown in FIG. 1 as a conventional microcomputer, including microprocessor unit 60, input/output ports 62, an electronic storage medium for executable programs and calibration values (shown as read only memory chip 64 in this particular example), random access memory 66, keep alive memory 69, and a conventional data bus. Controller 12 is shown receiving various signals from sensors coupled to engine 10, in addition to those signals previously discussed, including measurement of inducted mass air flow (MAF) from mass air flow sensor 70 coupled to throttle body 32; engine coolant temperature (ECT) from temperature sensor 72 coupled to cooling sleeve 74; a profile ignition pickup signal (PIP) from Hall effect sensor 76 coupled to crankshaft 20; throttle position TP from throttle position sensor 78; and manifold absolute pressure (MAP) signal from sensor 71.

Engine 10 may be configured to have variable intake valve and exhaust valve timing capabilities. For example, engine 10 may include electromechanically actuated valves that are controlled by controller 12. Alternatively, as shown in the depicted embodiment, engine 10 may include a mechanism to mechanically vary the intake and/or exhaust valve timings, for example by adjusting the timing of a camshaft. In the depicted embodiment, camshaft 90 of engine 10 is shown communicating with rocker arms 52 and 54 for actuating intake valve 26 and exhaust valve 28. Camshaft 90 is directly coupled to housing 56. Housing 56 forms a toothed wheel having a plurality of teeth 58. Housing 56 is hydraulically coupled to an inner driving member (not shown), which is in turn directly linked to crankshaft 20 via a timing chain (not shown). Therefore, housing 56 and camshaft 90 rotate at a speed substantially equivalent to the inner driving member. The inner driving member rotates at a constant speed ratio to crankshaft 20. However, by manipulation of the hydraulic coupling as will be described later herein, the relative position of camshaft 90 to crankshaft 20 can be varied by control of hydraulic pressures in advance chamber 100 and retard chamber 102. For example, by allowing high pressure hydraulic fluid to enter advance chamber 100 while allowing fluid to escape from retard chamber 102, the relative relationship between camshaft 90 and crankshaft 20 is advanced. Thus, intake valve 26 and exhaust valve 28 open and close at a time earlier than normal relative to crankshaft 20. Similarly, by allowing high pressure hydraulic fluid to enter retard chamber 102 while allowing fluid to escape from advance chamber 100, the relative relationship between camshaft 90 and crankshaft 20 is retarded. Thus, intake valve 26 and exhaust valve 28 open and close at a time later than normal relative to crankshaft 40.

Teeth 58, being coupled to housing 56 and camshaft 90, allow for measurement of relative cam position via cam timing sensor 104 providing variable camshaft timing (VCT) signal to controller 12. In the depicted embodiment, four teeth (labeled 1, 2, 3 and 4) are provided for measurement of cam timing and are equally spaced (for example, 90 degrees apart from one another) while tooth 5 at a different spacing may be used for cylinder identification. In addition, controller 12 sends control signals to conventional solenoid valves (not shown) to control the flow of hydraulic fluid either into advance chamber 100, retard chamber 102, or neither.

It will be understood that FIG. 1 merely shows one cylinder of a multi-cylinder engine, and that each cylinder has its own set of intake/exhaust valves, fuel injectors, etc. It will further be understood that the depicted engine 10 is shown only for the purpose of an example, and that the systems and methods described herein may be implemented in or applied to any other suitable engine having any suitable components and/or arrangement of components. For example, intake valve 26 and exhaust valve 28 may be electromechanically actuated, and camshaft 90 (and various associated parts) may be omitted. Likewise, separate camshafts may be used to control the opening of intake valve 26 and exhaust valve 28. Where each valve is operated by a separate camshaft, each camshaft may include a variable timing mechanism such as that shown for camshaft 90 in FIG. 1 to allow the exhaust valve timing to be varied independent of the intake valve timing, and vice versa, via a variable cam timing system.

Note that the control and estimation routines included herein-below can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Figure 2:
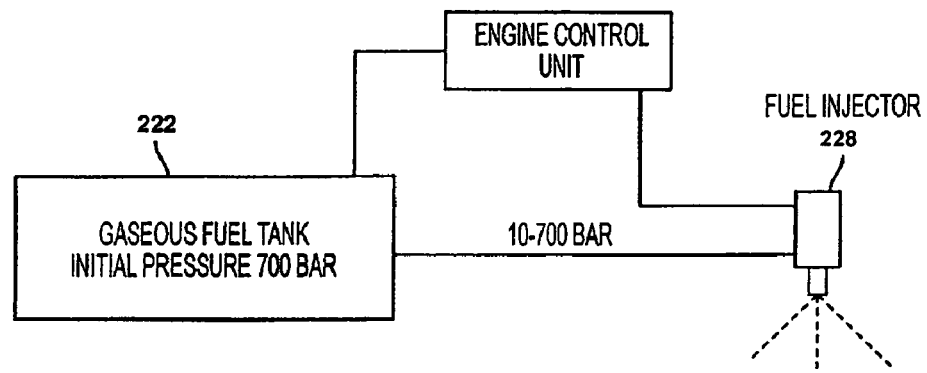
FIG. 2 is a schematic diagram of first exemplary embodiment of a fuel injector and the fuel supply system.

FIG. 2 is a schematic diagram of first exemplary embodiment of a fuel injector and the fuel supply system. In the depicted embodiment, the gaseous fuel tank 222 may be coupled to the fuel injector 228 directly without pressure regulation. Tank 222 may be a high strength carbon fiber tank in one example. The tank may store gaseous fuel at the pressure range of 350-700 bar, for example. In one embodiment, the gaseous fuel may contain approximately 10 kilograms of hydrogen and have an initial pressure of 700 bar. In another embodiment, the pressure supplied to fuel injector 228 or the fuel rail pressure may be in the range of 10 to 700 bar.

Fuel injector 228 may include a fast response type injector. For example, the injector may incorporate piezoelectric or magnetorestrictive actuation which may result in fast response and flexible multi-event injection across broad flow and pressure ranges. In one example, an injector may deliver between 1 and 16 mg per injection within a 40 degree crank window at up to 700 RPM at any pressure from 10 to 700 bar pressure. It should be appreciated that any suitable injectors with predictable behavior over (that can operate in a) wide pressure and pulse width range may be used.

In the example of FIG. 2, the system operates the fuel injector substantially at the tank pressure, which combined with appropriate direct injection timing, enables recovery of the compressed energy in tank via in-cylinder expansion. For example, by utilizing injection at or near top dead center of piston position in the compression stroke (of a 4-stoke cycle) improved engine efficiency may be achieved. Further details of injection timing and energy recovery are described in further detail below with regard to FIG. 8, for example.

Figure 3:
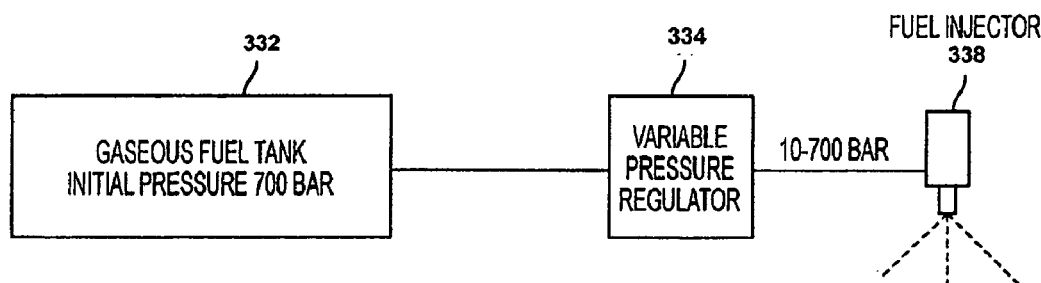
FIG. 3 is a schematic diagram of a second exemplary embodiment of a fuel injector and the fuel supply system.

FIG. 3 is a schematic diagram of a second exemplary embodiment of a fuel injector and its fuel supply system. In the depicted embodiment, the system is similar to the system illustrated in FIG. 2, however a variable pressure regulator 334 is provided. The regulator 334 may be disposed between the gaseous fuel tank 332 and the fuel injector 338. In one embodiment, the variable pressure supplied to injector 338 has a range of 10-700 bar.

Note that the variable pressure regulator 334 may be communicated with engine control unit such as controller 12 as described in FIG. 1 so that desired pressure may be provided to the injector 338 based on the engine operating conditions via controller 12. In one example, the amount of regulation or the regulation pressure may be adjusted in response to fuel tank pressure and engine operating conditions. For example, the regulation may be coordinated with fuel injector performance that may vary with engine speed and the amount of fuel to be delivered taking into account tank pressure. Thus, at higher tank pressures, higher engine speed, and/or lower fuel demand (injection amount), increased pressure regulation (e.g., a lower regulated pressure) may be provided, and vice versa. Thus, as fuel is used from the tank, pressure regulation may be decreased to the point where substantially no regulation is provided.

Figure 5:
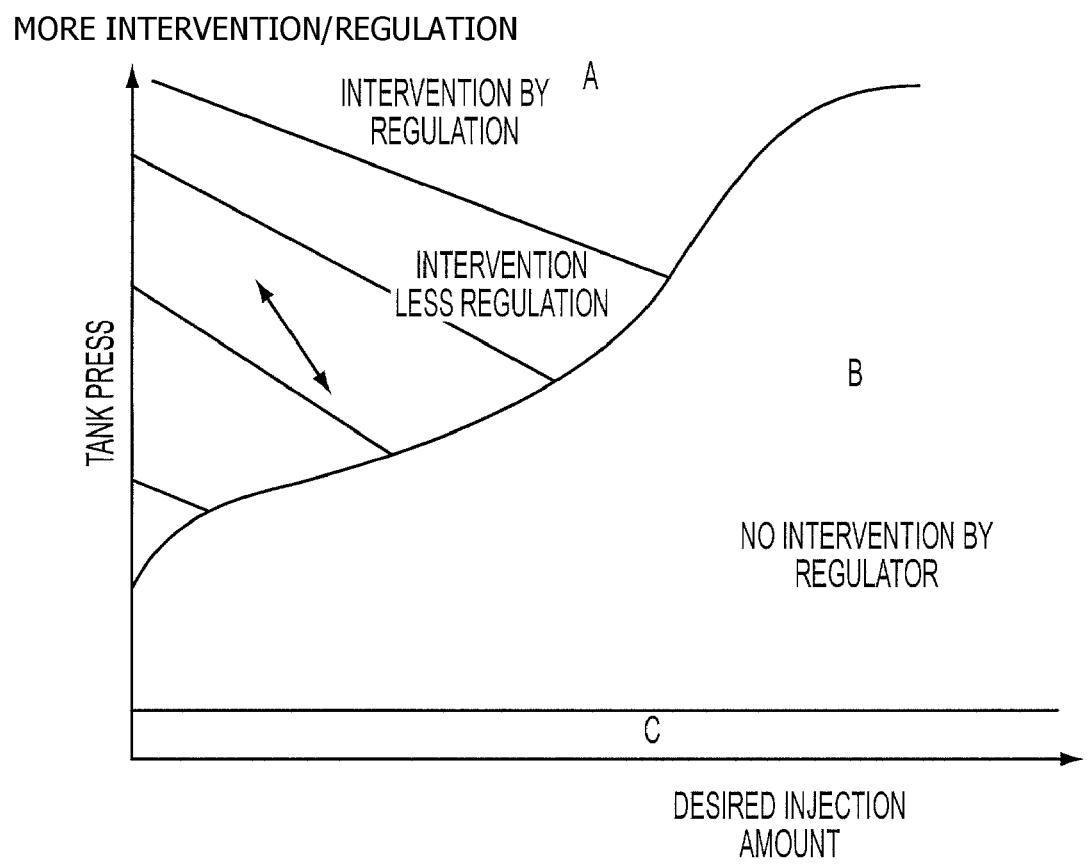
FIG. 5 is a schematic diagram illustrating variation in pressure regulation with example operating conditions.

Such a system may allow for improved use of compressed energy in the fuel tank and improved fuel delivery accuracy even under widely varying tank pressure and engine speed/load operation as illustrated in FIG. 5 below.

Figure 4:
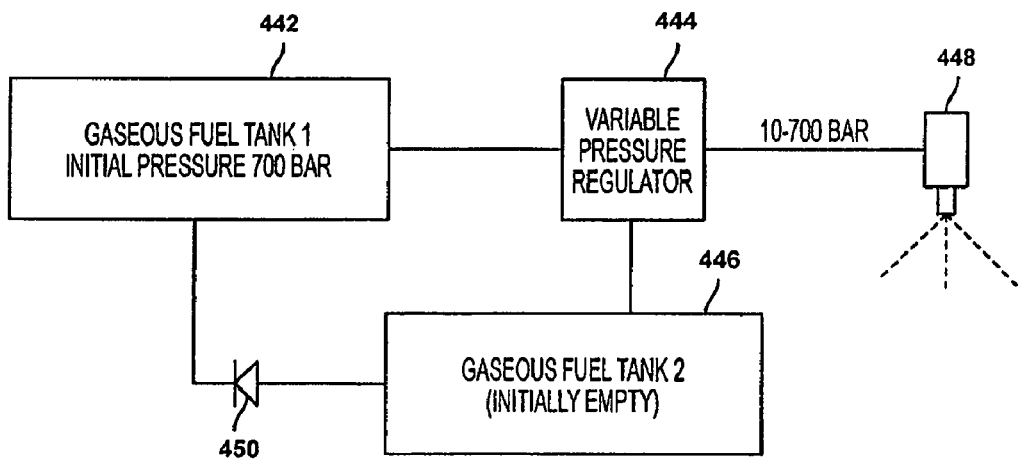
FIG. 4 is a schematic diagram of a third exemplary embodiment of a fuel injector and the fuel supply system.

FIG. 4 is a schematic diagram of a third exemplary embodiment of a fuel injector and its fuel supply system. In the depicted embodiment, the variable pressure regulator 444 may be disposed between the first gaseous fuel tank 442 and the fuel injector 448. A second gaseous fuel tank 446 may be disposed downstream of first fuel tank 442 and coupled to variable pressure regulator 444. Check valve 450 may be disposed between tanks 442 and 446. In one embodiment, the variable pressure supplied to injector 448 has a range of 10-700 bar.

In some embodiments, second fuel tank 446 may be substantially empty initially. Then, when the reduced rail pressure is required for the operation of fuel injector 448, check valve 450 may be opened to rapidly release the pressure at the first fuel tank 442 and fill the gaseous fuel into second fuel tank 446. Second fuel tank 446 then may be used later to supply fuel to the engine, such as at low rail pressure operation.

The system may provide flexible rail pressure regulation to enable the fuel injector to operate within the operating range while enhance the energy recovery from the fuel tank, while avoiding energy losses of regulation. In other words, when regulation may be used due to operation at high speeds and/or high tank pressures, for example, the compressed energy may be stored in the second tank, while lowering pressure of the fuel injector. In this way, pressure recovery is increased while maintaining improved injector controllability.

Referring now to FIG. 5, it shows schematically pressure regulation activity varying with tank pressure and desired fuel injection amount. Thus, depending on the engine operating conditions, the pressure supplied to the fuel injector or the rail pressure may vary. The region which may utilize increased pressure regulation is labeled as region A, where tank pressure is higher and desired injection amount is lower. As fuel is supplied to the engine, tank pressure may decrease to a range suitable for the operation of the injector without regulation. Thus, less or no pressure regulation may be utilized as indicated in the region is labeled as region B. As tank pressure is lowered to a certain level such as 10 bar, the tank may not be able to supply desired fuel at a desired flow rate, which refers to the region labeled as region C.

For example, in some systems, when the tank is at high pressure (700 bar for example), the fuel injector may be unable to accurately deliver a low fuel flow (1 mg/injection for example). Thus, the tank pressure may be regulated in order to provide a desired fuel amount, while still enabling some energy recovery. However, as the tank pressure lowers or the injection amount increases, reduced regulation may be provided, thus increasing energy recovery.

Therefore, in some embodiments, to obtain an accurate fuel injection control with increased pressure recovery over a wide tank and engine operating range, pressure regulation devices such as the variable pressure regulator, an additional fuel tank or other suitable pressure regulation device may be selectively used. For example, the exemplary embodiments described in FIGS. 3 and 4 may be advantageous in some settings by providing pressure regulation that adapts to the changes both in tank pressure and engine load.

Figure 6:
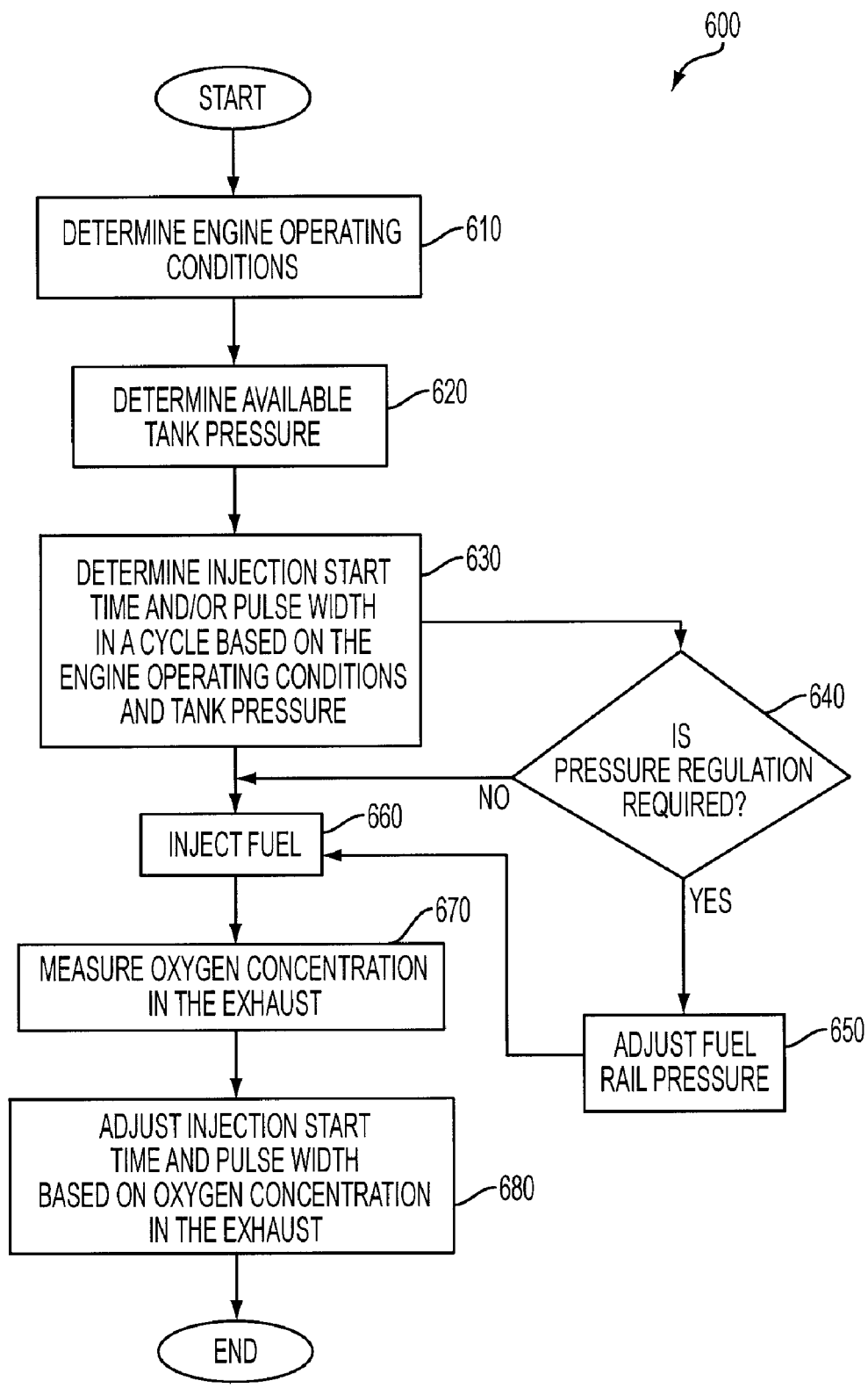
FIG. 6 is a flow diagram of one exemplary embodiment of a method to control fuel injection based on the engine operating condition and fuel tank pressure.

Referring now to FIG. 6, it shows a flow diagram of one embodiment of a method to control fuel injection based on the engine operating conditions and fuel tank pressure. The routine 600 first determines engine operating conditions in 610. The engine operating conditions may include engine speed, air flow rate, torque demand, etc. Next, the routine, in 620, determines tank pressure. The tank pressure, engine speed, and air flow rate may determine the amount of fuel capable of being delivered into the combustion chamber as desired.

Next, the routine, in 630, determines injection start timing and/or pulse width in a cycle based on the engine operating conditions and tank pressure. As described above, fuel injector may have operating limitations. Thus, tank pressure or fuel rail pressure supplied to the fuel injector may affect the delivery of fuel into a cylinder. However, the injection start time and injection duration may be varied to provide the required fuel based on tank pressure or fuel rail pressure at specific operating condition. For example, it may be possible to inject the appropriate fuel quantity per cylinder by a suitable calculation of the injection open pulse-width duration by incorporating tables of injector flow rate at various supply pressures in the engine control unit. Alternatively, other approaches such as empirical correlation between injector flow rate and supply pressure may be used.

In one example, the injection timing is provided to end as late as possible in the compression stroke or expansion stroke before the spark event to enable increased energy recovery. In some embodiments, injection may start as late as possible in the compression stroke or near the top dead center, which makes it possible to recover the injection pressure energy of the gaseous fuel. Therefore, in some embodiment, the fuel pressure (up to the maximum tank pressure under some conditions) may be recovered.

Similarly, spark timing may be varied to enable the desired combustion at variable tank pressure. Thus, alternatively or additionally, in some embodiments, spark timing may be determined based on operating conditions and tank pressure. Optionally, throttle settings may be varied to enable a fuel injector to operate within its performance range based on operating conditions and tank pressure.

Continuing with FIG. 6, the routine, in 640, determines whether the pressure from the fuel tank should be regulated. As described above, pressure regulation may be used depending on tank pressure, engine speed, and/or desired fuel amount in some embodiments.

Continuing with FIG. 6, if the answer to step 640 is no, the routine, in 660, injects fuel to the cylinder. If the answer to step 640 is yes, the routine, in 650, adjusts fuel rail pressure to a value suitable for the current operating conditions. Then, the routine continues to step 660 which includes injecting fuel to the cylinder. Next, the routine, in 670, measures oxygen concentration in the exhaust. The oxygen concentration may be determined by one or more oxygen sensors, for example, which may be indicative of exhaust air-fuel ratio.

Next, the routine, in 680, adjusts injection start time and pulse width based on oxygen content and/or measured air-fuel ratio. In this way, combustion may be controlled at the desired conditions such as at a desired lean, stoichiometric, or rich air-fuel ratio over widely varying tank pressure while still recovering compression energy from the fuel tank. Thus, by utilizing injection timing and/or duration adjustments in response to both the exhaust gas oxygen sensor and operating conditions of the fuel system, such as fuel injection pressure, it is possible to achieve accurate fuel amount delivery while also enabling delivery during conditions that enable improved energy recovery in the engine.

Figure 7:
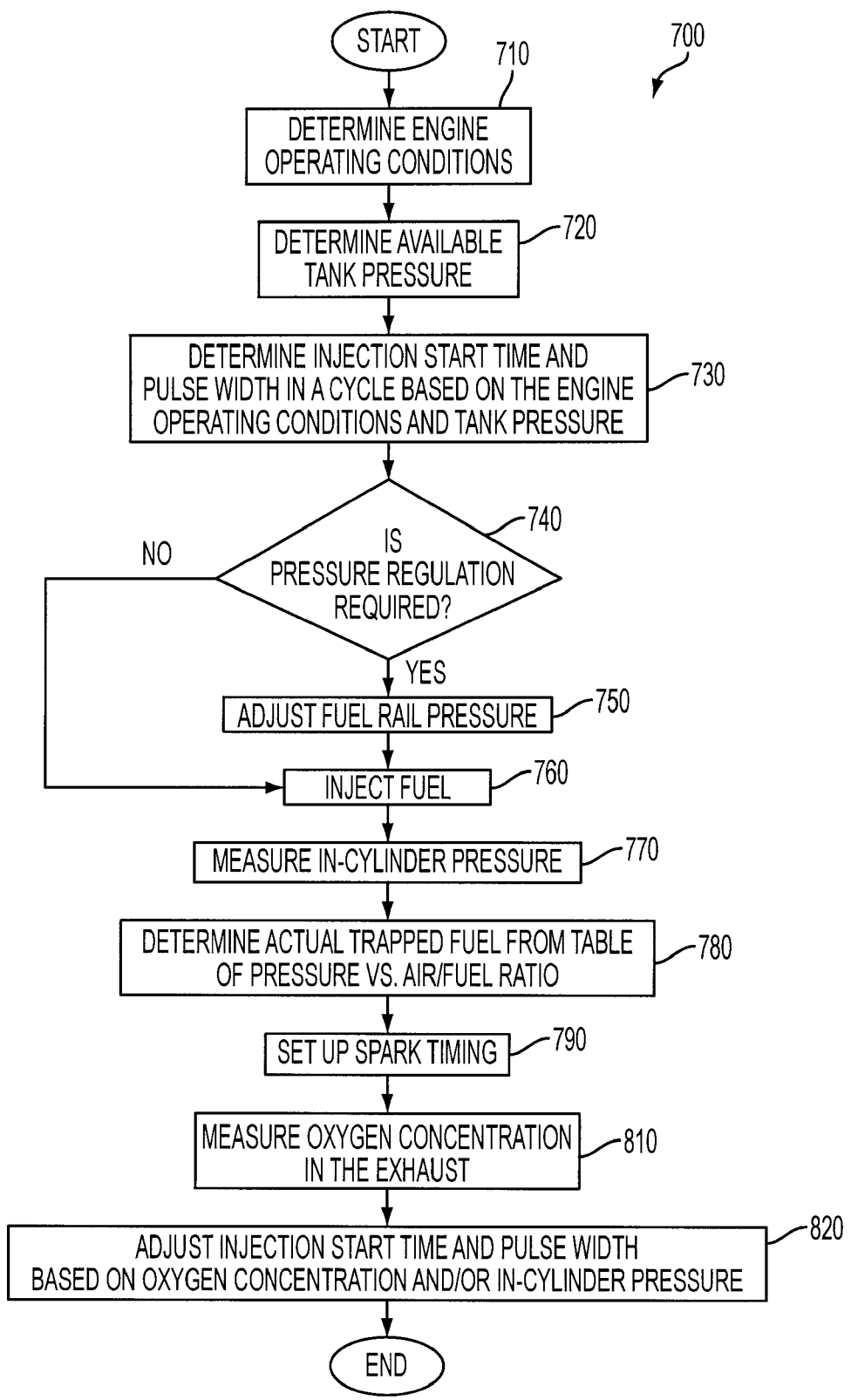
FIG. 7 is a flow diagram of another exemplary embodiment of a method to control fuel injection based on the engine operating condition and fuel tank pressure.

FIG. 7 is a flow diagram of another exemplary embodiment of a method to control fuel injection based on the engine operating condition and fuel tank pressure. First, the routine 700 determines engine operating conditions in 710. The engine operating conditions may include engine speed, air flow rate, torque demand, etc.

Next, the routine, in 720, determines tank pressure. The tank pressure, engine speed, and air flow rate may determine the amount of fuel capable of being delivering into the combustion chamber as desired. Then, the routine, in 730, determines injection start timing and/or pulse width in a cycle based on the engine operating conditions and tank pressure. Next, the routine, determines, in 740, whether the pressure from the fuel tank should be regulated. If the answer to step 740 is no, the routine, in 760, injects fuel to the cylinder. If the answer to step 740 is yes, the routine, in 750, adjusts fuel rail pressure to a value suitable for the current operating conditions. Then, the routine continues to step 760 which includes injecting fuel to the cylinder.

Next, the routine, in 770, measures in-cylinder pressure. Based on in-cylinder pressure, the routine, in 780, may determine the actual trapped fuel from a table of pressure versus air/fuel ratio. Then, the routine, in 790, sets up spark timing based on various conditions such as engine speed, air/fuel ratio, ambient conditions, etc. to achieve a desired combustion. Next, the routine, in 810, measures oxygen concentration in the exhaust. The oxygen concentration may be determined by one or more oxygen sensors, for example, which may be indicative of exhaust air-fuel ratio. Thus, the routine, in 820, adjusts injection start timing and pulse width based on oxygen concentration.

It should be noted that the routine may be performed in different sequences from those depicted in FIGS. 6 and 7. Also, one or more steps in the routine may be skipped or added. For example, in some embodiments, the routine 700 may skip steps 790 and 810. Thus, combustion information is obtained only from the in-cylinder pressure sensor. Alternatively, in other embodiments, following step 780, spark timing may be determined to perform desired combustion based on the actual fuel in the cylinder. Then, the routine may skip step 810 and thus adjusts injection start time and pulse width without information from measurement of oxygen concentration in the exhaust.

Figure 8:
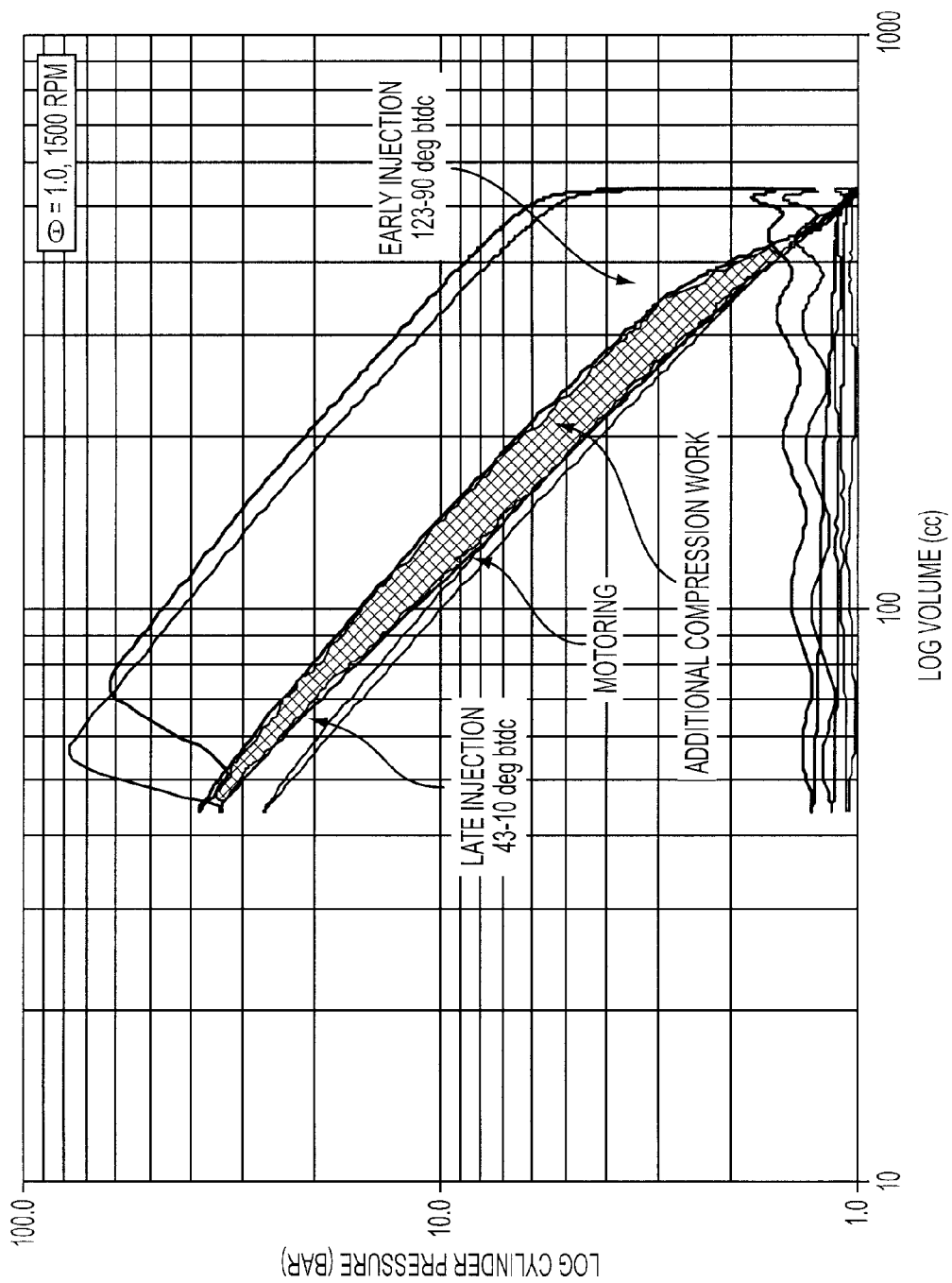
FIG. 8 shows the relationship between cylinder pressure and cylinder volume, illustrating the thermodynamic effects of injection timing.

FIG. 8 shows the relationship between cylinder pressure and cylinder volume, illustrating the thermodynamic effects of injection timing. In particular, the graph illustrates cylinder pressure versus cylinder volume at 1500 RPM and stoichiometry. Further, it illustrates the increased efficiency (less compression work required) achieved by late direct injection of fuel at increased fuel pressures, such as at fuel tank pressure, as compared with early injection for a direct injection engine. In this particular example, late end-of-injection occurs 43-10 degrees BTDC, whereas early injection occurs 123-90 degrees BTDC. Compared to work done in a port fuel injection engine, late injection improves efficiency due to less compression work required and increased expansion work performed because of tank pressure recovery while early injection does not improve efficiency. Please note that this is just one example of early and late injection, variation in the timing is possible.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine capable of burning gaseous fuel, the engine also including a combustion chamber, a fuel supply system with at least one fuel tank, at least one intake valve, and at least one exhaust valve, an injector to directly inject gaseous fuel into the combustion chamber, and an exhaust oxygen sensor, the method comprising:
   directly injecting fuel from the injector into the chamber at a variable supply pressure which decreases as fuel tank pressure decreases; and
   adjusting at least one of an injection time and duration based at least on said variable pressure and information from the exhaust oxygen sensor, where the injection is performed with the intake valve closed and during a later half of a compression stroke, even as the supply pressure decreases to a low range where supply pressure energy is recovered in the combustion chamber.

2. The method of claim 1, wherein the fuel injection starts near an end of a compression stroke.

3. The method of claim 2, wherein the fuel injection time starts near a top dead center before the compression stroke is complete.

4. The method of claim 1, wherein the pressure supplied to the injector is regulated by a pressure regulation device.

5. The method of claim 4, wherein the pressure regulation device includes a variable pressure regulator or a second fuel tank.

6. The method of claim 1 wherein the fuel injector comprises a piezoelectric actuator.

7. The method of claim 6, wherein the method further includes adjusting spark timing based at least on said variable pressure and information from the exhaust oxygen sensor.

8. The method of claim 6, wherein the method further includes adjusting throttling based at least on said variable pressure and information from the exhaust oxygen sensor.

9. The method of claim 6, wherein the method further includes adjusting at least one of an injection time and duration based on information from an in-cylinder pressure sensor.

10. A method for an engine capable of burning gaseous fuel, the engine also including a combustion chamber, a fuel supply system having fuel storage and at least one pressure regulation device, and a piezoelectrically actuated injector to directly inject gaseous fuel into the combustion chamber, the method comprising:

supplying fuel from the fuel storage to the piezoelectrically actuated injector under a first engine and tank condition with a higher tank pressure by substantially regulating down fuel tank pressure, the injector directly injecting the supplied fuel with regulation to the cylinder at least during a later half of a compression stroke;

supplying fuel from the fuel storage to the piezoelectrically actuated injector under a second engine and tank condition with a lower tank pressure and without substantially regulating down fuel tank pressure, the injector directly injecting the supplied fuel without regulation to the cylinder at least during a later half of a compression stroke with an intake valve closed;

varying an amount of regulation during the first tank and engine condition in response to the first engine and tank condition; and adjusting at least one of an injection time and duration based at least on an injection pressure during at least said first and second engine and tank condition.

11. The method of claim 10, wherein the first tank and engine condition includes a high fuel tank pressure and a low required fuel amount.

12. The method of claim 10, wherein the second tank and engine condition includes a range of pressure that is within an operation range of the fuel injector.

13. The method of claim 10, wherein the pressure regulation device includes one of a variable pressure regulator and a second fuel tank.

14. The method of claim 10, wherein the method further includes adjusting spark timing based at least on said variable pressure and information from an exhaust oxygen sensor.

15. A system for an engine having a cylinder, comprising:
a first gaseous fuel tank;
a second gaseous fuel tank selectively coupled to the first fuel tank;
a direct injector coupled to the cylinder, the injector coupled at least to the first fuel tank;
a variable pressure regulator coupled between the first and second tank, where during at least one condition, the variable pressure regulator reducing fuel rail pressure by diverting gaseous fuel into the second tank; and
a control system operating the injector to delivery gaseous fuel directly to the cylinder during engine operation, and varying a fuel pressure delivery to the injector by selectively coupling the second gaseous fuel tank to the first gaseous fuel tank at least as a pressure in the first tank and a condition of the engine varies.

16. The system of claim 15 wherein the injector includes piezoelectric actuation.

17. The system of claim 16 wherein the second tank is coupled to the first tank through a selectively activatable check valve.

18. The system of claim 15 where the control system further operates to supply fuel from the second fuel tank to the engine during a low fuel rail pressure condition.

* * * * *